United States Patent [19]

Mori et al.

[11] Patent Number: 4,727,541
[45] Date of Patent: Feb. 23, 1988

[54] HIERARCHICAL DATA TRANSMISSION SYSTEM

[75] Inventors: Masakazu Mori; Takeo Fukushima; Naonobu Fujimoto, all of Kawasaki, Japan

[73] Assignee: Fujitsu Limited, Kawasaki, Japan

[21] Appl. No.: 804,550

[22] Filed: Dec. 4, 1985

[30] Foreign Application Priority Data

Dec. 6, 1984 [JP] Japan .................. 59-256545

[51] Int. Cl.⁴ .............. H04J 3/04; H04J 3/06
[52] U.S. Cl. .................. 370/112; 370/102; 370/110.1; 370/111
[58] Field of Search ........... 370/112, 111, 110.1, 370/105, 84, 102

[56] References Cited

U.S. PATENT DOCUMENTS

| 4,271,508 | 6/1981 | Schenk | 370/112 |
| 4,504,943 | 3/1985 | Nagano et al. | 370/112 |
| 4,519,073 | 5/1985 | Bertocci et al. | 370/111 |
| 4,520,480 | 5/1985 | Kawai | 370/111 |
| 4,538,286 | 8/1985 | McNesby et al. | 370/111 |
| 4,593,390 | 6/1986 | Hildebrand et al. | 370/112 |

FOREIGN PATENT DOCUMENTS

| 0054120 | 6/1982 | Fed. Rep. of Germany | 370/112 |
| 0087938 | 5/1983 | Japan | 370/111 |

OTHER PUBLICATIONS

"Transmission Systems in Fujitsu, Jun. 1980" published by Fujitsu Limited, pp. 2-13 to 2-24.
"ICC'84 Links for the Future, Science, Systems & Services for Communications.
IEEE International Conference on Communications, May 14-17, 1984.
RAI Congress Centre, Amsterdam, The Netherlands", pp. 779 through 782.

Primary Examiner—Michael A. Masinick
Assistant Examiner—Curtis Kuntz
Attorney, Agent, or Firm—Staas & Halsey

[57] ABSTRACT

A hierarchical data transmission system is comprised, on the transmitter side, of pre-group multiplexers and a main-group multiplexer and, on the receiver side, of a main-group demultiplexer and pre-group demultiplexers. The main-group multiplexer is fabricated as a parallel-serial converting unit, and the main-group demultiplexer is fabricated as a serial-parallel converting unit. Each of the pre-group multiplexers produces a pre-group data train having a sub-data signal which is also utilized for distinguishing one pre-group data train from another. Each of the pre-group demultiplexers is provided with a discriminator operative, by using the sub-data signal, to distinguish one received pre-group data train from another.

18 Claims, 37 Drawing Figures

Fig. 3

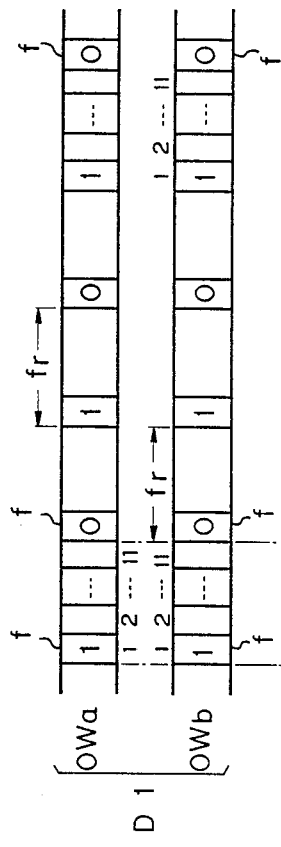
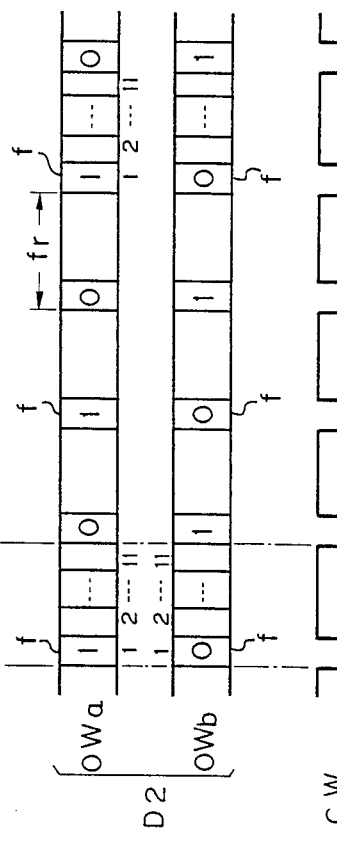
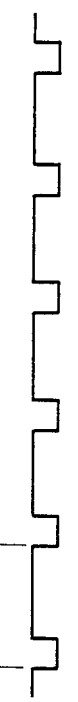
Fig. 4A
Fig. 4B
Fig. 4C

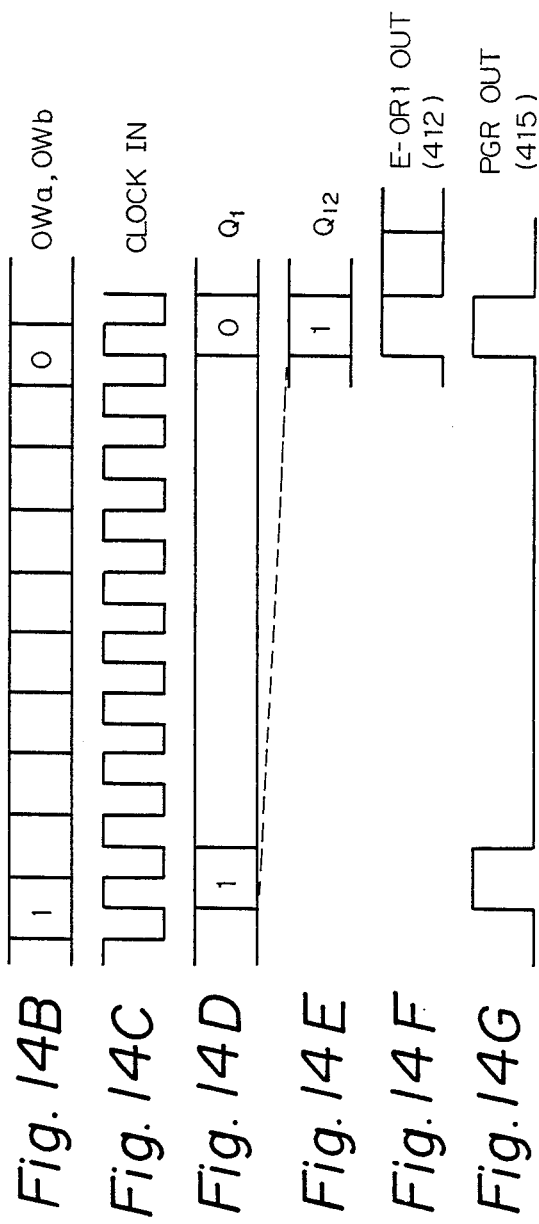

```
OWa  0 0 1 0 0 1 0 0 1 ···  ⎫
OWb  0 1 0 0 1 0 0 1 0 ···  ⎬ D1
OWc  1 0 0 1 0 0 1 0 0 ···  ⎭
```

```
OWa  0 0 1 0 0 1 0 0 1 ···  ⎫
OWb  0 0 1 0 0 1 0 0 1 ···  ⎬ D2
OWc  0 1 0 0 1 0 0 1 0 ···  ⎭
```

```
OWa  0 0 1 0 0 1 0 0 1 ···  ⎫
OWb  0 0 1 0 0 1 0 0 1 ···  ⎬ D3
OWc  0 0 1 0 0 1 0 0 1 ···  ⎭
```

HIERARCHICAL DATA TRANSMISSION SYSTEM

BACKGROUND OF THE INVENTION

1. Field of the Invention

The present invention relates to a hierarchical data transmission system in which a plurality of data trains are multiplexed and transmitted from a transmitter side thereof and the thus transmitted data trains are received at a receiver side thereof and demultiplexed therein to reproduce the original data trains.

2. Description of the Related Art

A hierarchical data transmission system basically comprises a side for dealing with data of a low order group and a side for dealing with data of a high order group. The high order group of data is produced by summing at least two low order groups of data, so that the high order group of data provides a very high transmission rate, and accordingly, the high order group contains a great amount of data.

Specifically, a hierarchical data transmission system is known in which, for example, first and second 9-channel data trains, each having a transmission rate of 45 Mb/s, are multiplexed to obtain another data train having a transmission rate of 405 Mb/s. Further, recently an optical signal has been used to realize a very high transmission rate, i.e., a great amount of transmission data. In such an optical transmission system, it is preferable to further multiplex, for example, two of the aforesaid data trains having a transmission rate of 405 Mb/s, to obtain another data train which has a transmission rate as high as 810 Mb/s (=405+405).

In the prior art multiplex system, the above-mentioned multiplexing is achieved as follows. The first 9-channel data trains, each having the transmission rate of 45 Mb/s, are multiplexed on the transmitter side by a first pre-group multiplexer to obtain a first pre-group data train having a transmission rate of 405 Mb/s, and simultaneously, the second 9-channel data trains, each having the transmission rate of 45 Mb/s, are multiplexed by a second pre-group multiplexer to obtain a second pre-group data train having a transmission rate of 405 Mb/s. Then the first and second pre-group data trains, having a transmission rate of 405 Mb/s are again multiplexed by a main-group multiplexer to obtain an output data train to be transmitted; this output data train having the transmission rate of 810 Mb/s. The output data train is then received at a receiver side, which is comprised of a main-group demultiplexer and first and second pre-group demultiplexers. In the receiver side, the received input data train having a transmission rate of 810 Mb/s is first demultiplexed by the main-group demultiplexer to produce a first pre-group data train and a second pre-group data train; and the two data trains are then respectively applied to the first and second pre-group demultiplexers to obtain the original first and second 9-channel data trains.

Thus, the prior art main-group multiplexer and main-group demultiplexer must operate at a very high operation speed, i.e., 810 Mb/s. Further, the main-group multiplexer on the transmission side must achieve a particular processing therein, such as a known stuffing synchronization, whereby the multiplexer necessarily becomes complicated in construction and has a high cost. Similarly, the main-group demultiplexer on the receiver side is also required to further achieve a known destuffing synchronization, conforming to the above-mentioned stuffing on the transmitter side, whereby the demultiplexer also necessarily becomes complicated in construction and has a high cost.

SUMMARY OF THE INVENTION

Accordingly, an object of the present invention is to provide a hierarchical data transmission system having a construction comprising simplified main-group multiplexing and demultiplexing units but retaining the function of distinguishing one pre-group data train from another pre-group data train. The simple construction allows the main-group multiplexing and demultiplexing units to be manufactured at a low cost.

The above-mentioned object is attained by using means for performing a parallel-serial conversion as the aforesaid main-group multiplexer, to multiplex a plurality of pre-group data trains and produce a transmission data train, and means for performing a serial-parallel conversion as the aforesaid main-group demultiplexer, to demultiplex the received transmission data train. Each of the transmission data trains is composed of both a main-data signal and a sub-data signal, and the sub-data signals of each transmission data train are composed of signal patterns different from each other, to enable one pre-group data train to be distinguished from another pre-group data train.

BRIEF DESCRIPTION OF THE DRAWINGS

The present invention will be more apparent from the ensuing description with reference to the accompanying drawings, wherein:

FIG. 3 depicts an example of a data format of a pre-group data train;

FIGS. 4A, 4B, and 4C depict bit patterns of the order-wires for distinguishing one data train from another data train;

FIGS. 14B through 14G depict waveforms of signals appearing at portions shown in FIG. 14A;

DESCRIPTION OF THE PREFERRED EMBODIMENTS

Before describing the embodiments of the present invention, the related art and the disadvantages therein will be described with reference to the related figure.

Figure 1:
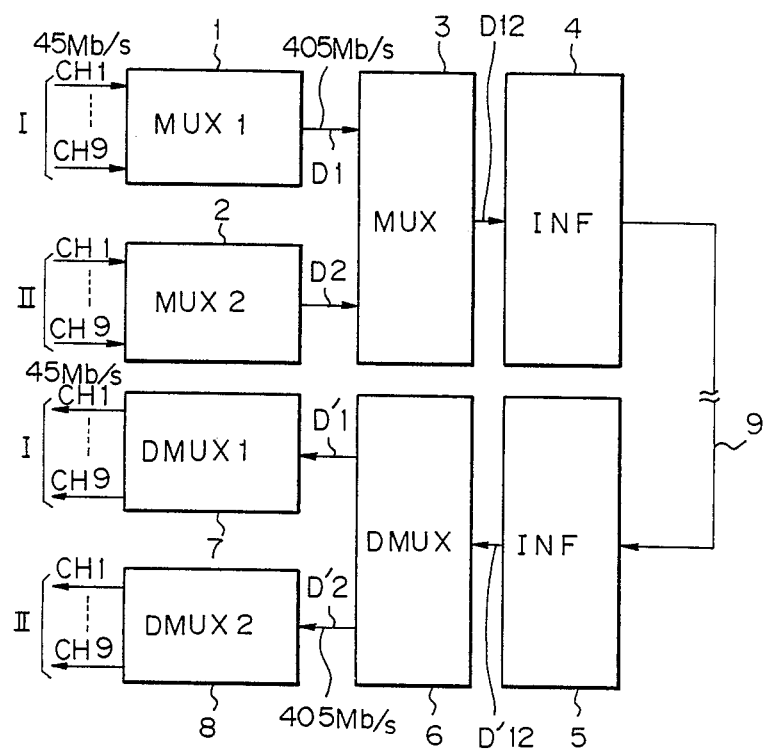
FIG. 1 illustrates a conventional hierarchical data transmission system.

FIG. 1 illustrates a conventional hierarchical data transmission system. In FIG. 1, the main part of the transmission system comprises a transmitter side, a receiver side, and a transmission line 9 distributed therebetween. The transmitter side is comprised of a first pre-group multiplexer (MUX1) 1, a second pre-group multiplexer (MUX2) 2, a main-group multiplexer (MUX) 3, and an interface unit (INF) 4. The receiver side is comprised of an interface unit (INF) 5, a main-group demultiplexer (DMUX) 6, a first pre-group demultiplexer (DMUX1) 7, and a second pre-group demultiplexer (DMUX2) 8.

On the transmitter side, the data trains I and II are, for example, 9-channel data trains. Only two data trains are shown in the drawing, but three or more data trains may be handled, if necessary. Each data train has a transmission rate of, for example, 45 Mb/s.

The 9 channels (CH1 - CH9) of the first data train I are multiplexed in the first pre-group multiplexer (MUX1) 1, to obtain a figrst pre-group data train D1 having a transmission rate of 405 (=45×9) Mb/s. Similarly 9 channels (CH1 - CH9) of the second data train II are multiplexed in the second pre-group multiplexer (MUX2) to obtain a second pre-group data train D2 having a transmission rate of 405 (=45×9) Mb/s.

Where the data transmission system uses optical data transmission, the system can transfer a great amount of data. To this end, it is possible to further multiplex the two pre-group data trains D1 and D2 to obtain a main-group data train. According to a conventional method, the pre-group data trains D1 and D2 are multiplexed on the transmission side by a main-group multiplexer (MUX) 3, to produce a main-group data train D12 having a transmission rate of 810 Mb/s. The train D12 is then input, via the interface unit (INF) 4, to the transmission line 9, as the output data train to be transmitted. Note, in the optical system concerned, the interface unit 4 operates, as an electro-optic converter, to enable it to be coupled with the related optical fiber, i.e., the transmission line 9. Alternatively, if a known coaxial cable is used as the transmission line 9, the interface unit 4 operates as a unipolar-bipolar converter.

On the receiver side of the data transmission system, the received input data train is applied to the interface unit (INF) 5, which operates in reverse to the transmitter side interface unit 4. That is, the unit 5 carries out an opto-electric conversion or a bipolar-unipolar conversion. The converted electric signal of 810 Mb/s is then supplied, as the received main-group data train D'12, to the main-group demultiplexer (DMUX) 6, and the train D'12 is then demultiplexed to produce the first pre-group data train D'1 and the second pre-group data train D'2, each having a transmission rate of 405 Mb/s. The pre-group data trains D'1 and D'2 are further demultiplexed, respectively, by the first and second pre-group demultiplexers (DMUX1, DMUX2) 7 and 8, and accordingly, the original channels of both the first and second data trains I and II are reproduced.

Thus, the transmitter side of a hierarchical transmission system can comprise a multiple-stage connection of the multiplexers 1, 2, and 3, and the receiver side can comprise a multiple-stage connection of the demultiplexers 6, 7, and 8. This system is disclosed in, for example, "ICC'84
LINKS FOR THE FUTURE
Science, Systems & Services for Communications
    IEEE International Conference on Communications
May 14–17, 1984
RAI Congress Centre, Amsterdam, The Netherlands", pages 779 through 782.

However, the conventional hierarchical data transmission system produces the previously mentioned problem, which will be clarified below.

The pre-group multiplexers 1 and 2 are provided with respective oscillators (not shown in FIG. 1), each oscillator generating a clock signal of 405 MHz. The main-group multiplexer 3 is also provided with a respective oscillator (not shown in FIG. 1) generating a clock signal of 810 MHz. This allows these units to plan individual roles, i.e., multiplexing and demultiplexing. In the multiplexing process by the transmitter, it is important to minimize any phase deviation between the first and second data trains I and II having a transmission rate of 45 Mb/s. One of the techniques for minimizing the phase deviation is known as "stuffing synchronization". When stuffing synchronization is performed in each of the first and second pre-group multiplexers 1 and 2, the following stage multiplexer 3 must operate at a very high operation speed. This produces a disadvantage in that the main-group multiplexer 3 must have a complicated construction, and accordingly, a high cost. On the other hand, in the main-group demultiplexer 6 on the receiver side, usual frame synchronization is achieved at an operation speed the same as that for the transmission, so that the received data train having a transmission rate of 810 Mb/s is demultiplexed into the data trains D'1 and D'2, each having a transmission rate of 405 Mb/s. Obviously, this means that the demultiplexer 6 concerned also must operate at a very high operation speed to achieve a destuffing synchronization that will cope with the above-mentioned transmitter side stuffing synchronization. Therefore, the higher the transmission rate, the more complicated becomes the construction of the demultiplexer 6.

Figure 2:
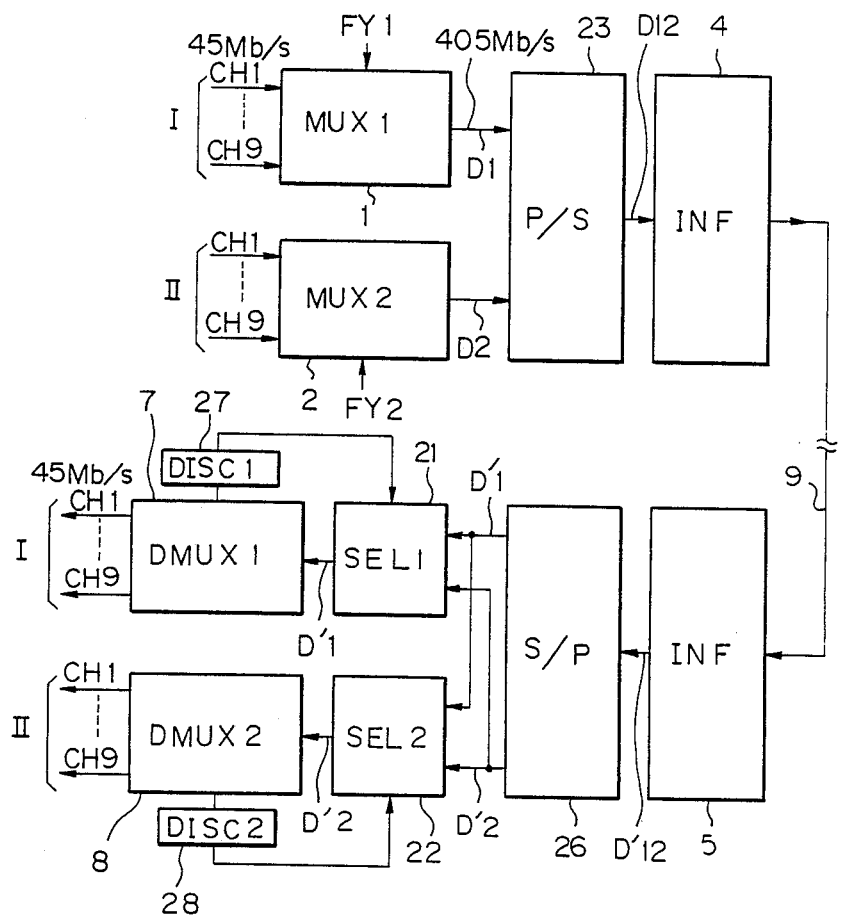
FIG. 2 illustrates a hierarchical data transmission system according to the present invention.

FIG. 2 illustrates a hierarchical data transmission system according to the present invention. In FIG. 2, components the same as those of FIG. 1 are represented by the same reference numerals or characters; this also applies to all later figures. Therefore, only the components 21, 22, 23, 26, 27 and 28 are newly employed as compared with the system shown in FIG. 1. On the transmitter side, 23 represents means for performing a parallel-serial conversion and is functionally identical to the prior art main-group multiplexer (MUX) 3. Preferably the means 23 is a parallel-serial converter. On the receiver side, 21 represents a first selector (SEL1) and 22 a second selector (SEL2). Reference 26 represents means for performing a serial-parallel conversion and is functionally identical to the prior art main-group demultiplexer (DMUX) 6. The component 27 cooperates with the first pre-group demultiplexer 7 and acts as a first discriminator (DISC1). Similarly, the component 28 cooperates with the second pre-group demultiplexer 8 and acts as a second discriminator (DISC2). The discriminators 27 and 28 switch the selection states in the selectors 21 and 22 respectively. The multichannel data trains I, which are, for example, 9-channel data trains each having a transmission rate of 45 Mb/s, are applied to the first pre-group multiplexer 1 and multiplexed therein to produce the first pre-group data train D1 having a transmission rate of 405 Mb/s. Similarly, the multichannel data trains II, which are, for example, 9-channel data trains each having a transmission rate of 45 Mb/s, are applied to the second pre-group multiplexer 2 and multiplexed therein to produce the second pre-group data train D2 having a transmission rate of 405 Mb/s, as in the conventional system of FIG. 1. At this time, the previously mentioned stuffing synchronization is carried out in each of the multiplexers 1 and 2, thus obtaining the first and second pre-group data trains D1 and D2 having a transmission rate of 405 Mb/s. In this case, it is important to note that the first and second sub-data signals (FY1, FY2 in FIG. 2) are supplied to the first and second multiplexers 1 and 2, respectively, and multiplexed therein with respective main-data signals. Generally, each of the pre-group data trains is mainly composed of both a main-data signal and a sub-data signal. The main-data signal transfers inherent main data information, such as voice signals, computer data, and so on. Conversely, the sub-data signal transfers cooperative control information, such as a so-called order-wire signal, supervisory signal, fault indication signal, and so on. According to the present invention, the signal pattern of the first sub-data signal to be multiplexed, together with the first main-data signal, in the first data train D1 is, in advance, intentionally made different from the signal pattern of another signal, i.e., the second sub-data signal to be multiplexed together with the second main-data signal, in the second data train D2.

The thus-multiplexed first and second pre-group data trains D1 and D2 having a transmission rate of 405 Mb/s including the sub-data signals are input to the parallel-serial converter (P/S) 23, wherein the two data trains D1 and D2 are further multiplexed. Since the two parallel data trains having a transmission rate of 405 Mb/s are serialized by the P/S converter 23, the resultant serial data train, i.e., a main-group data train D12, assumes a transmission rate of 810 Mb/s. The basic concept of the present invention resides in the above-mentioned parallel-serial conversion for realizing the identical function achieved by the conventional main-group multiplexer 3. The main-group data train D12 having a transmission rate of 810 Mb/s is sent from the P/S converter 23, via the interface unit (INF) 4, to the transmission line 9.

On the transmitter side of the system, a clock signal of 810 MHz is supplied to the main-group P/S converter 23, i.e., a main-group multiplexer. The clock signal is generated by a suitable oscillator, not shown in FIG. 2. Therefore, the related parallel-serial conversion is achieved in synchronism with the clock signal of 810 MHz. At the same time, the clock signal of 810 MHz is divided in frequency by 2, and the frequency-divided clock signal of 405 MHz is supplied to both the first and second pre-group multiplexers 1 and 2. The multiplexers 1 and 2 achieve the respective multiplexing operations for the multichannel data trains I and II, respectively, by using the divided clock signal of 405 MHz, so as to produce the first and second pre-group data trains D1 and D2. Thus, the oscillator is used, on the one hand, for producing the clock signal of 810 MHz, and on the other hand, for producing the clock signal of 405 MHz. This means that the synchronization between the pre-group multiplexers 1 and 2 and the main-group multiplexer, i.e., the P/S converter 23, can be always ensured. When establishing the related main-group multiplexing by using the P/S converter 23, it is essential to maintain the synchronization therebetween. The use of such a P/S converter is very beneficial from the economical viewpoint, as compared with the conventional main-group multiplexer. However, when the P/S converter such as this is used, there is some inconvenience caused by the fact that it is impossible to distinguish, on the receiver side, one data train from another data train. That is, the main-group data train D12 from the P/S converter 23 is merely an alternating mixture of the first and second pre-group data trains D1 and D2. Accordingly, it is also important to introduce means for distinguishing one data train (D1) from the other data train (D2).

On the receiver side of the system, the output data train, i.e., the main-group data train D12, is received from the transmission line 9 and then supplied to the interface unit (INF) 5 first. The received main-group data train is then supplied to the serial-parallel converter (S/P) 26, wherein the multiplexed serial data train D'12 having a transmission rate of 810 Mb/s is demultiplexed into the first pre-group data train D'1 and the second pre-group data train D'2. The thus demultiplexed pre-group data trains D'1 and D'2 are then applied to the first selector (SEL1) 21 and the second selector (SEL2) 22. The selector 21 selects a specified one of the data trains D'1 and D'2 and the selector 22 selects the other data train, in accordance with the first and second control signals supplied from the discriminators 27 and 28, respectively. Although the output from the S/P converter 26 is, as mentioned previously, an alternating mixture of the two data trains, the selectors 21 and 22 can separate the two data trains into one data train, i.e., the data train D'1, and into another data train, i.e., the data train D'2. Thus pre-determined first and second pre-group data trains D'1 and D'2 having a transmission rate of 405 Mb/s are applied to the first and second pre-group demultiplexers (DMUX1, DMUX2) 7 and 8, as in the conventional system, to obtain the first and second 9-channel data trains I and II having a transmission rate of 45 Mb/s, respectively.

The first and second discriminators 27 and 28 receive the demultiplexed sub-data signals individually from the demultiplexers 7 and 8, and discriminate whether or not the selected pre-group data trains coincide with the proper side data trains allotted, in advance, to the demultiplexers 7 and 8, by detecting the signal patterns of the sub-data signals. That is, when the discriminator 27 (28) finds that the pre-group data train, now selected by the selector 21 (22), is the proper side data train, i.e., D'1 (D'2), the discriminator 27 (28) causes the selector 21 (22) to leave the current selection state as it is. If the pre-group data is not the proper side data train but another or the wrong side D'2 (D'1) data train, the discriminator 27 (28) causes the selector 21 (22) to switch the selection state and hold the alloted proper side data train D'1 (D'2). As mentioned before, these two data trains D1 and D2 are differentiated by the individual signal patterns of the sub-data signals. The sub-data signal having one signal pattern is shown as FY1 in FIG. 2 and the sub-data signal having another signal pattern is shown as FY2. These signal patterns will be explained in detail hereinafter. Note, it should be understood that, in the example mentioned above, two pre-group data trains, each having the transmission rate of 405 Mb/s, are multiplexed into the main-group data train having a transmission rate of 810 Mb/s. However, the present invention can be applied to a case where three or more pre-group data trains, each having a transmission rate of 405 Mb/s, are multiplexed by parallel-serial conversion at the P/S converter. For example, if four pre-group data trains, each having a transmission rate of 405 Mb/s, are serialized by the P/S converter, the data trains are multiplexed to form a main-group data train having a transmission rate of 1620 (=405×4) Mb/s. In this case, the four data trains contained in the 1620 Mb/s data train must be distinguished from each other by using four individual sub-data signals having different signal patterns.

Figure 3:
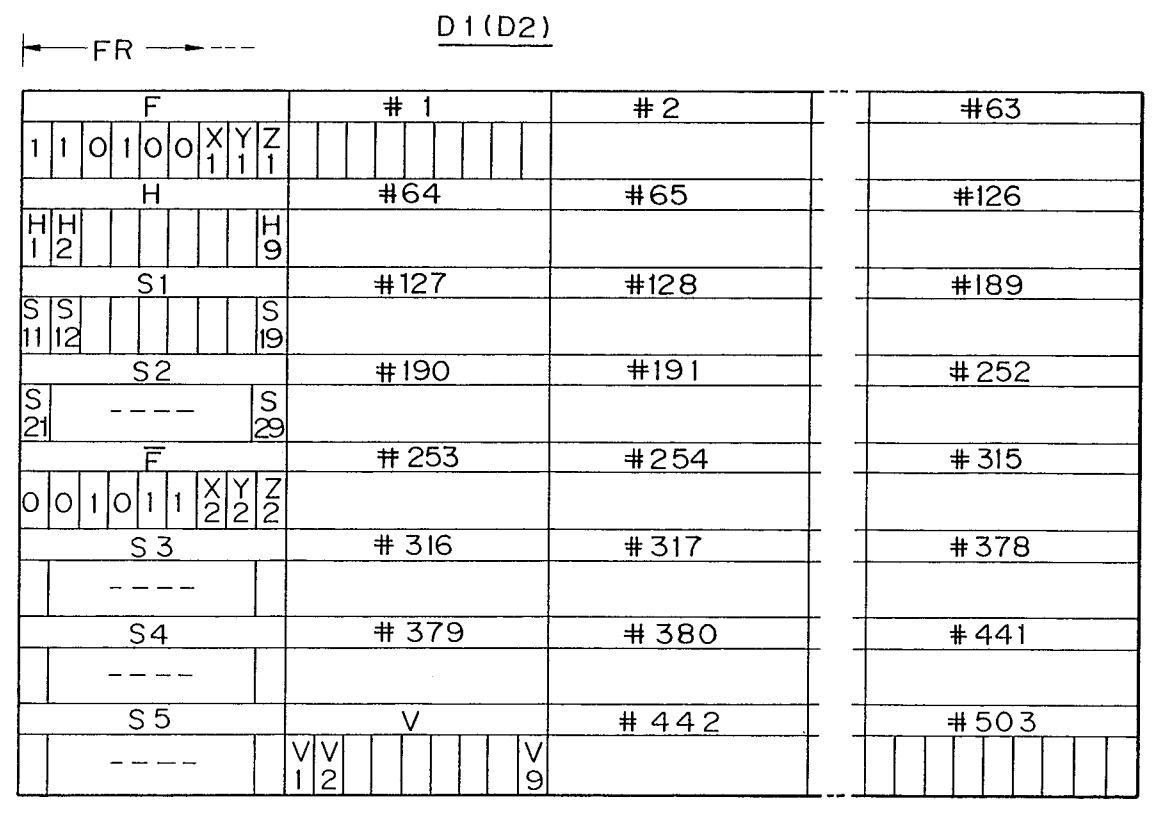

FIG. 3 depicts an example of a data format of a pre-group data train. Note, although only the pre-group data train D1 from the first pre-group multiplexer 1 (FIG. 2) is provided as the above example, the other data train D2 also has the same data format as shown in FIG. 3. Further, the bit patterns, starting from a frame synchronization signal "F" and continuing through "#1"—"#63", "H"—"#126", "S1"—"#189", "S2"—"#442"—, to the final main data "#503", consist of each frame (FR) contained in the data train D1 having a transmission rate of 405 Mb/s. Each of the frame synchronization signals F and $\overline{F}$ has a 9-bit construction. Of the 9 bits in the signal F, X1 represents a fault indication bit, Y1 an order-wire bit (OWa), and Z1 a parity bit. Of the 9 bits in the signal $\overline{F}$, X2 represents a control bit for a line protection switch, Y2 another order-wire bit (OWb), and Z2 a parity bit. A stuffing synchronization control signal S1 is composed of nine bits S11 through S19. An identical signal S2 is composed of nine bits S21 through S29. Note, the identical signals S3, S4, and S5 also have the same composition. A supervisory signal H is composed of nine bits H1 through H9. The bit portion V is composed of nine bits V1 through V9, and these are used as the variable time slots for executing the stuffing synchronization. The bit portions #1 through #503, each composed of nine bits, are used for transferring the inherent main-data signal. Thus, as can be seen from the figure, each frame is composed of a total of 4608 bits.

In the data format shown in FIG. 3, the sub-data signals (F, H, e,ovs/F/ , S1 - S5, V) are more pertinent to the present invention than the main-data signals (#1–#503), because the sub-data signal is used for distinguishing one data train from another data train after multiplexing a plurality of pre-group data trains to be transmitted. Among the variety of sub-data signals, according to the example of the present invention, the order-wire bits Y1 and Y2 are used for distinguishing the pre-group data trains. However, the fault indication signals X1 and X2, and the supervisory signal H also can be used, if necessary. In this case, other sub-data signals, such as the parity signals Z1, Z2, the stuffing synchronization control signals S1 - S5, and the bit portion V for the stuffing synchronization, are not as useful as the above former sub-data signals for this purpose. This is because the signal patterns of these latter sub-data signals should not be modified.

As mentioned above, according to an example of the present invention, the first and second pre-group data trains D1 and D2 can be distinguished, in the transmitter, from each other by watching the respective signal patterns of the sub-data signals, i.e., the order-wire bits Y1 and Y2 contained in the frame synchronization signals F and $\overline{F}$ in each frame (FR) starting from F and ending at #503 in FIG. 3. Note, the two order-wire signals (OWa, OWb) are usually used in each frame FR only for convenience in holding telephone communication open for maintenance between two terminal stations. For this purpose, specially processed order-wire bits Y1 and Y2 in the frame synchronization signal F are supplied to the multiplexers 1 and 2, as shown by FY1 and FY2 in FIG. 2.

The method by which the specially processed order-wire signals FY1 and FY2 can be used for the discrimination concerned, will be clarified below. The order-wire signal FY1 (also FY2), as well as the fault indication signal (X1, X2), is usually set up per frame. Therefore, the order-wire signal must contain the frame synchronization signal therein, as shown by the identical signal F ($\overline{F}$) for the frame FR. According to this example of the present invention, the frame synchronization signals (f) for the order-wires OWa and OWb, pertaining to the data train D1, are determined in advance to have the signal pattern, "101010+" in common. Conversely, the frame synchronization signal (f) for the order-wire OWa and OWb, pertaining to the data train D2, are determined in advance to have the signal patterns "101010−" and reversed "010101−", respectively. As can be seen from the above, when the signal patterns of the frame synchronization signal (f) for the order-wires OWa and OWb are detected, at the receiver side, as being the same as each other, then it is determined that the received and demultiplexed data train is D1. Conversely, if the signal patterns of the frame synchronization signal (f) for the order-wires OWa and OWb are with respect to each other, then it is determined that the received and demultiplexed data train is D2.

FIGS. 4A, 4B, and 4C depict bit patterns of the order-wires for distinguishing one data train from another data train. The bit patterns will further clarify the difference in the signal patterns of the sub-data signals, i.e., the order-wires OWa and OWb. The order-wire OWa (also OWb) is composed of successive frames fr to carry data such as voice signals. Each frame fr is composed of 11 bits and each head bit thereof serves as the frame synchronization signal f. Note that two bits of each of the order-wires OWa and OWb are collected every time the frame FR (FIG. 3) is sent to the receiver side. Therefore, the order-wires OWa and OWb usually have a very low frequency, as compared with the main- and sub-data signals.

In FIG. 4, CW denotes clock windows. The clock windows CW are shifted in time until alternating bits "1" and "0", and vice versa, are detected. At this time, it is determined that the order-wires OWa and OWb are synchronized, and accordingly, the information now received from the order-wires OWa and OWb is significant. Namely, the signal pattern of the order-wire OWa appears with a "1010—" pattern and this pattern coincides with the signal pattern of the order-wire OWb, and thus the related data train can be classified as D1 due to this signal pattern coincidence. Alternatively, if the signal pattern of the order-wire OWa appears with a "1010—" pattern and the pattern does not coincide with the other signal pattern, it is determined that the related data train is to be classified as D2.

Figure 5A:
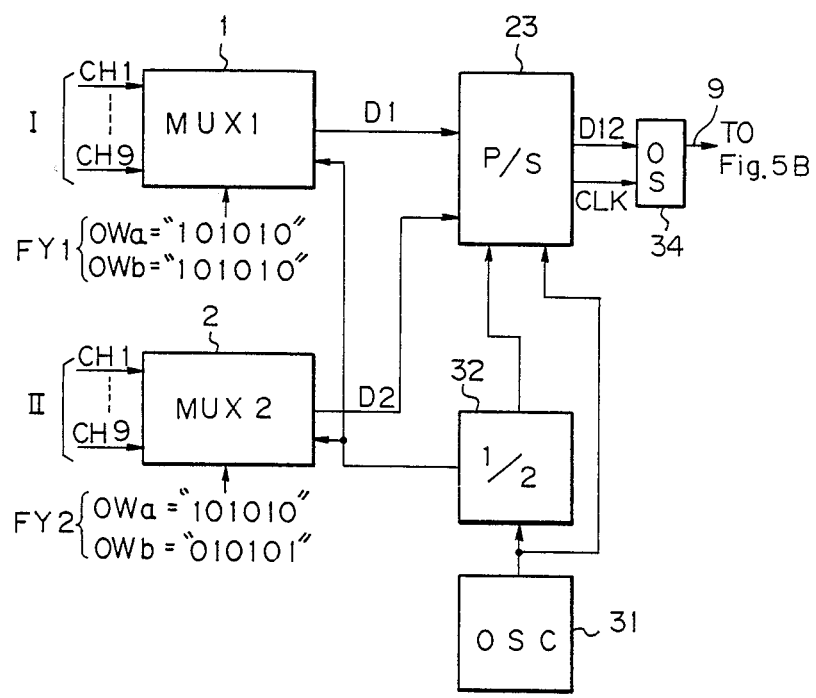
FIGS. 5A and 5B illustrate a hierarchical data transmission system according to the present invention, in which the order-wire signals are used for discrimination of the data trains.
Figure 5B:
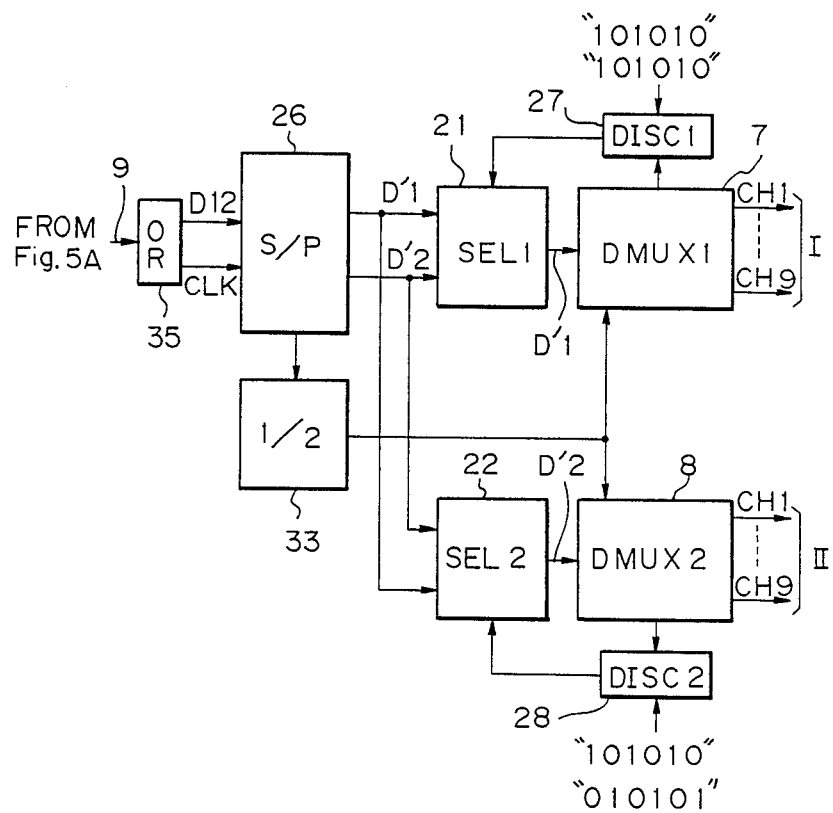

FIGS. 5A and 5B illustrate a hierarchical data transmission system, according to the present invention, in which the order-wire signals are used for the discrimination of data trains. That is, the sub-data signals FY1 and FY2 shown in FIG. 2 are specifically realized with the frame synchronization signals for the order-wires OWa and OWb. The frame synchronization signal f is supplied to the multiplexer 1 with the signal pattern of "1010—" for the order-wire OWa and also for the order-wire OWb, which signal patterns identify the data train as D1. On the other hand, the frame synchronization signal f is supplied to the multiplexer 2 with the signal pattern of "1010—" for OWa and the reversed "0101—" for the OWb, which signal patterns identify the data train as D2.

The first and second pre-group data trains D1 and D2 are produced by multiplexing with the frame order-wires having the specified patterns of the frame synchronization signals in the multiplexers 1 and 2, and by the stuffing synchronization operation. The thus-processed data trains D1 and D2 have the data format shown in FIG. 3, as mentioned previously. The main-group data train D12 is then obtained through the P/S converter 23. In this case, according to the previously described example, the multiplexers 1 and 2 are operated with a clock of 405 MHz, and the P/S converter 23 is operated with a clock of 810 MHz. These clocks must be synchronized with each other, as mentioned previously. To this end, an oscillator 31 generates a clock of 810 MHz, and the 810 MHz clock is directly supplied to the P/S converter 23, and a 405 MHz clock, which is divided in frequency by a frequency divider 32 having a dividing ratio of 1/2, is supplied to both the multiplexers 1 and 2. This enables provision of the pre-group data trains D1 and D2 synchronized with each other at 405 Mb/s, and simultaneously, the main-group data train D12 synchronized therewith at 810 Mb/s. Note that, in FIGS. 5A and 5B, components corresponding to the interface units 4 and 5 of FIG. 2 are exemplified by an optical sending unit (OS) 34 and an optical receiving unit (OR) 35, respectively.

On the receiver side of FIG. 5B, the clock of 810 Mb/s is reproduced in the unit 35 from the received data train D12 and sent to the S/P converter 26 for demultiplexing the data train D12 into the pre-group data trains D'1 and D'2. The above-mentioned clock of 810 Mb/s is divided in frequency by 2 by a frequency divider 33 to supply the divided clock commonly to both the demultiplexers 7 and 8. This clock distribution enables the establishment of a synchronization between the S/P converter 26 and the demultiplexers 7 and 8. At this time, the demultiplexed pre-group data trains D'1 and D'2 are applied to both the first and second selectors 21 and 22 simultaneously. Since the demultiplexer 7 produces the first multichannel data train I, the selector 21 must select the first pre-group data train D1. If the data train D1 is actually selected, the signal patterns derived from the demultiplexed data train would coincide with the previously allotted signal patterns illustrated at top right in FIG. 5B. The coincidence is detected by the discriminator 27, as explained before. This also applies to the detection of coincidence carried out on the side of the multichannel data train II, with the use of the allotted signal patterns illustrated at the bottom right in FIG. 5B.

Figure 6:
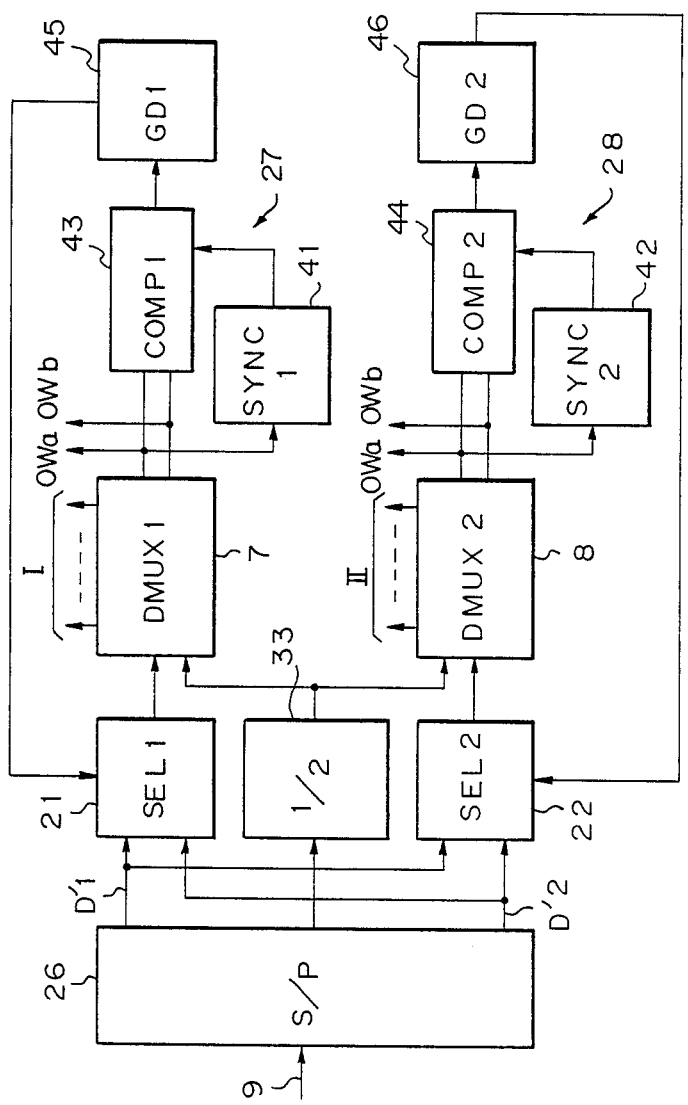
FIG. 6 illustrates a receiver of the hierarchical data transmission system, according to the present invention, showing a more detailed view of the discriminators.

FIG. 6 shows a receiver side of the hierarchical data transmission system, according to the present invention, and illustrates a more detailed diagram of the discriminators. The first discriminator 27 is comprised of a first synchronization circuit (SYNC1) 41, a first comparator (COMP1) 43, and a first safe guard circuit (GD1) 45. The second discriminator 28 has an identical circuit arrangement to that of the first discriminator 27, that is, the discriminator 28 is comprised of a second synchronization circuit (SYNC2) 42, a second comparator (COMP2) 44, and a second safe guard circuit (GD2) 46. The first comparator 43 operates to detect the coincidence between the signal patterns of the frame synchronization signals for the order-wires OWa and OWb, i.e., "1010—" and "1010—", and second comparator 44 operates to detect the non-coincidence between the signal patterns of the frame synchronization signals for the order-wires OWa and OWb, i.e., "1010—" and "0101—". In the first comparator 43, the related comparison is valid only when the synchronization is fully established regarding the order-wire signal, and accordingly, the comparator 43 is selectively activated by the output from the first synchronization circuit 41. This also applies to the second comparator 44, i.e., the comparator 44 is selectively activated by the output from the second synchronization circuit 42.

The first safe guard circuit 45 operates to count the predetermined number of successive identical logic outputs, to ensure a correct switching for the selector 21. This circuit 45 can comprise a counter. This also applies to the second safe guard circuit 46. If the selector 21 correctly holds the proper side data train, i.e., the discriminator 27 maintains the selection state at the selector 21 as it is, or if not, the discriminator 27 causes the selection state to change. Thus the selector 21 holds the proper side data train, i.e., D'1. This also applies to the other side data train(D'2), discriminator 28, and selector 22.

Figure 7:
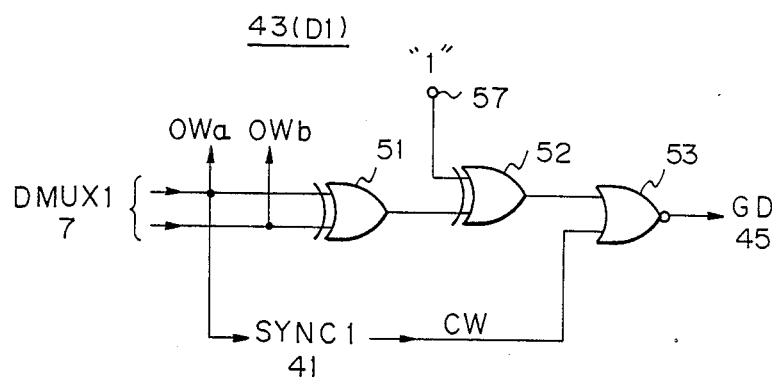
FIG. 7 is a detailed example of the first comparator in FIG. 6.
Figure 8:
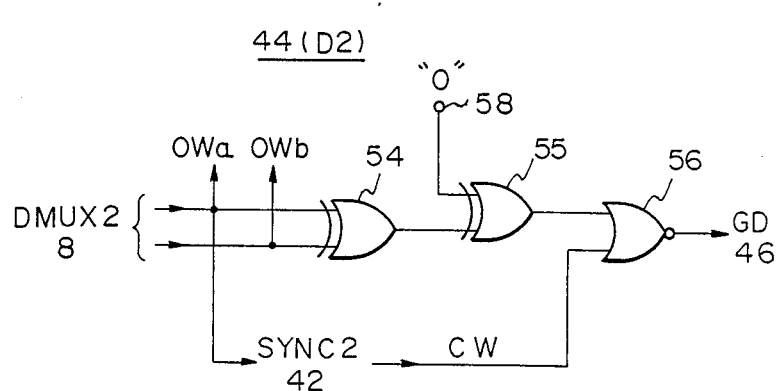
FIG. 8 is a detailed example of the second comparator in FIG. 6.

FIG. 7 illustrates a detailed example of the first comparator in FIG. 6, and FIG. 8 illustrates a detailed example of the second comparator in FIG. 6. In FIGS. 7 and 8, a preset terminal 57 is fixedly supplied with logic "1", and the corresponding terminal 58 is fixedly supplied with logic "0". The frame synchronization signals of the order-wires OWa and OWb are selected at NOR gates 53 and 56 with the aid of the synchronization circuits 41 and 42, respectively. The signal patterns for the proper side data train D1 coincide with each other, and therefore a first EXOR (exclusive OR) gate 51 produces a logic "0", because of this coincidence. The thus-produced logic "0" is supplied to a second EXOR gate 52, which produces a logic "1". Thus, the NOR gate 53 produces a logic "0", which is valid every time the clock window CW (FIG. 4C) is generated, so as to seek only the frame synchronization signal f (FIGS. 4A and 4B). In this case, the selector 21 maintains the selection state thereof as it is. If the output logic of the NOR gate 53 indicates "1", this means that the selection state should be changed to the other side to hold the proper side data train (D1).

On the other hand, the signal patterns for the other side data train D2 do not coincide with each other, and therefore a first EXOR gate 54 produces a logic "1". Accordingly, a second EXOR gate 55 produces a logic "1". Thus, the NOR gate 56 produces a logic "0", which is valid every time the clock window is generated, as for the own side data train D1. In this case, the selector 22 maintains the selection state thereof as it is. If the output logic of the NOR gate 56 indicates "1", this means that the selection state should be changed to the other side to hold the other side data train (D2).

In FIGS. 7 and 8, the preset terminals 57 and 58 are preferably fabricated as connectors connectable to suitable pins supplying logic levels "0" and "1". Usually, the demultiplexers 7 and 8 are fabricated, as integral units, independent from each other. Further, the demultiplexer units are mounted separately, by inserting the units into a shelf. In this case, the units are connected via connectors (57, 58), respectively, and thus the respective pins automatically supply the logic "1" and "0", respectively, to the connectors 57 and 58. This produces an advantage in that the separation from one side multichannel data train D1 to the other side multichannel data train D2 can be smoothly and easily attained. In this case, the logic to be supplied to the pins can be specified by a computer managing the overall transmission system. If three or more multichannel data trains, e.g., D1, D2, D3—, are involved, it is sufficient to provide a plurality of pins for each respective connector. When, for example, two pins are provided for each connector, four ($=2^2$) different data trains D1 through D4 can be discriminated from one another.

Figure 9:
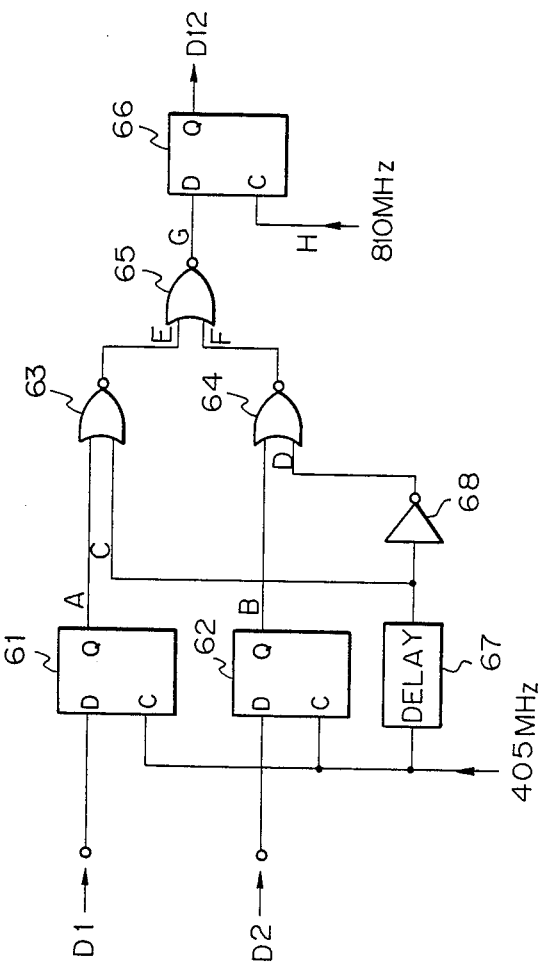
FIG. 9 is a circuit diagram of an example of the parallel-serial converting multiplexer shown in FIGS. 2 and 5A.
Figure 10A:
FIGS. 10A through 10H depict waveforms of signals appearing at portions A through D shown in FIG. 9, respectively.
Figure 10B:
Figure 10C:
Figure 10D:
Figure 10E:
Figure 10F:
Figure 10G:
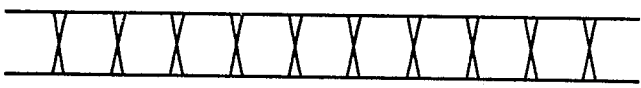
Figure 10H:

FIG. 9 is a circuit diagram of an example of the parallel-serial converting multiplexer 23 shown in FIGS. 2 and 5A. The P/S converter 23 is generally comprised of a plurality of front stage D-flip-flops for receiving the individual data trains and driven by a sub-clock, a plurality of reading gates which are connected to the outputs of the corresponding D-flip-flops and sequentially read the outputs thereof by using a processed sub-clock, to obtain serialized data trains having a transmission rate substantially equal to the reference clock, and a rear stage D-flip-flop receiving the thus-obtained serialized data trains and producing the main-group data train in synchronism with the reference clock. The P/S converter 23 of FIG. 9 is constructed to conform with the previous example, that is the two data trains D1 and D2 having a transmission rate substantially equal to the 405 MHz (sub-clock) are serialized into the main-group data train D12 having a transmission rate substantially equal to the clock of 810 MHz. Accordingly, two front stage D-flip-flops 61 and 62 are used. The outputs from the D-flip-flops 61 and 62 are supplied to the reading gates, which consist of a first NOR gate 63, a second NOR gate 64, a delay element 67, and an inverter 68. These reading gates (63, 64, 67, 68) produce serialized first and second data trains from a NOR gate 65, which are then applied to a rear stage D-flip-flop 66 to produce the main-group data train D12 synchronized with the reference clock of 810 MHz.

FIGS. 10A through 10H depict waveforms of signals appearing at portions A through D shown in FIG. 9, respectively. The operation of the P/S converter 23 shown in FIG. 9 will be further clarified by referring to FIGS. 10A through 10H.

Figures 11, 12A, 12B, 12C, 12D:
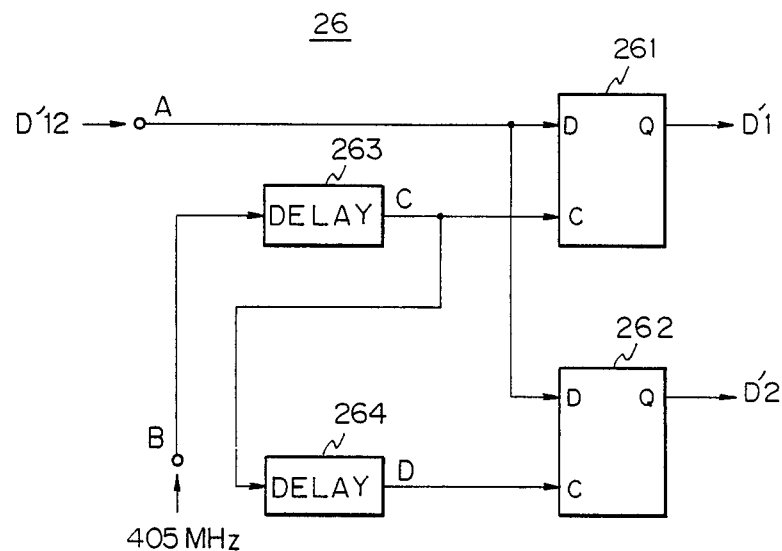
FIG. 11 is a circuit diagram of an example of the serial-parallel demultiplexer shown in FIGS. 2, 5A, and 6.
FIGS. 12A through 12D depict waveforms of signals appearing at portions shown in FIG. 11, as denoted by the characters A through D, respectively.

FIG. 11 is a circuit diagram of an example of the serial-parallel converting demultiplexer shown in FIGS. 2, 5A, and 6. The S/P converter 26 can be generally comprised of a plurality of D-flip-flops and a plurality of shift clock generators. According to the previously mentioned example, two kinds of pre-group data trains D1 and D2 are dealt with, and accordingly, a first D-flip-flop 261 and a second D-flip-flop 262 are employed. These flip-flops are driven by first and second clocks from a first delay element 263, such as a delay line, and a second delay element 264, respectively. The first delay element 263 receives the sub-clock, i.e., 405 MHz.

FIGS. 12A through 12D depict waveform of signals appearing at portions A through D in FIG. 11, respectively.

The operation of the S/P converter 26 will be explained with reference to FIGS. 12A through 12D. The sub-clock of 405 MHz (FIG. 12B) at the portion B is obtained from the received data train D12 shown in FIG. 12A. The delay elements 263 and 264 are used for adjusting the phase of the clock in such a manner that the clocks at the portions C and D can correctly strike at the center of each of the data trains D'1 and D'2, as schematically illustrated by vertical arrows in FIGS. 12C and 12D.

Figure 13:
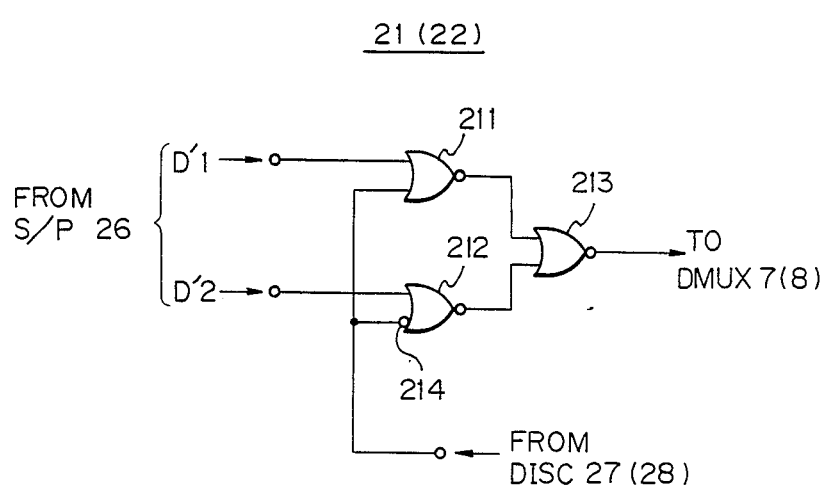
FIG. 13 is a circuit diagram of an example of the selector (SEL1) shown in FIGS. 2, 5A, and 6.

FIG. 13 illustrates a circuit diagram of an example of the selector (SEL1) shown in FIGS. 2, 5A, and 6. The first and second selectors 21 and 22 have the same construction, and therefore, only the first selector (SEL1) 21 is representatively illustrated in FIG. 13. The selector 21 can be generally comprised of a plurality of NOR gates. One of the NOR gates is allowed to pass therethrough the received pre-group data train, in accordance with the instructions given from the corresponding discriminator (DISC1) 27. According to the previously mentioned example, two pre-groups data trains D'1 and D'2, and therefore, two NOR gates 211 and 212 are employed. The control signal therefor is supplied from the discriminator 27, via the safe guard circuit 45, so that either one of the data trains D'1 and D'2 is selected due to an inverting input 214. The thus-selected data train is applied, vai a the OR gate 213, specifically shown in the form of a NOR gate in FIG. 13, to the first demultiplexer (DMUX1) 7.

Each of the synchronization circuits (SYNC1, SYNC2), shown by 41 and 42 in FIG. 6, can be generally formed with a comparator, an inhibiting gate, and a pattern generator. The comparator receives, on one hand, the pre-group data train and, on the other hand, the predetermined frame signal patten. The comparator produces an inhibiting signal every time a noncoincidence therebetween is detected by the comparator. The inhibiting gate passes therethrough a sub-data clock signal generated in the demultiplexer 7, to be supplied to the pattern generator. The pattern generator produces the frame synchronization signal. In this case, the inhibiting gate operates to stop the passage of the sub-data cloth ever time a noncoincidence occurs.

Figure 14A:
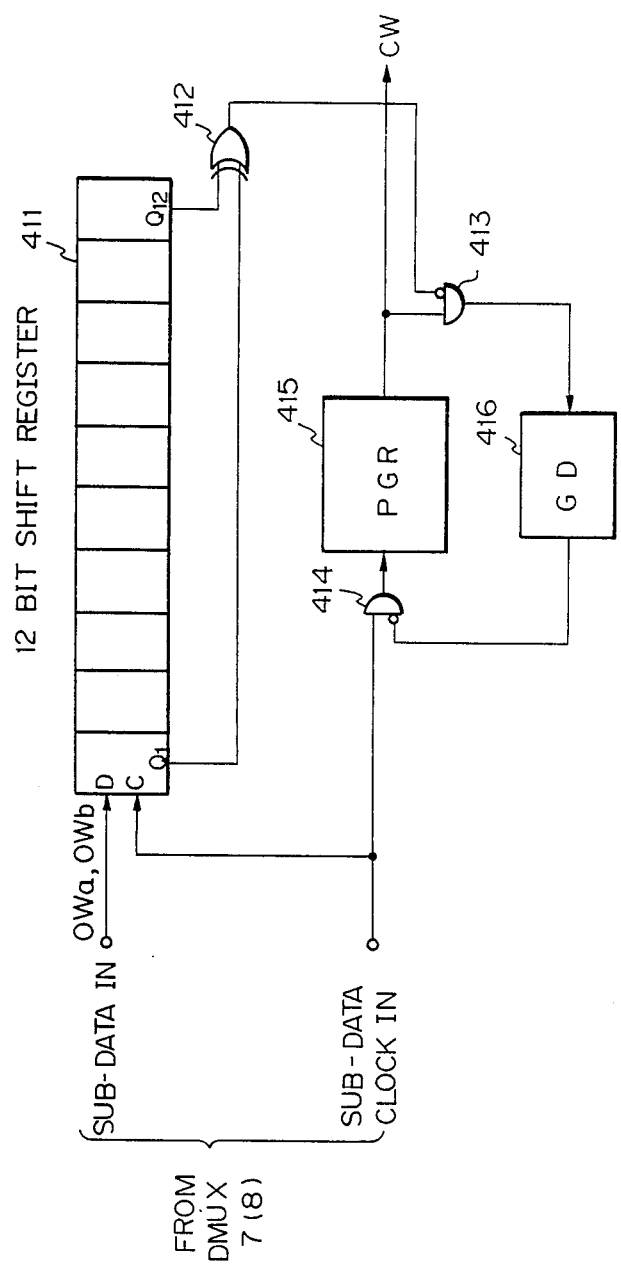
FIG. 14A is a circuit diagram of an example of the synchronization circuit shown in FIG. 6.

FIG. 14A is a circuit diagram of an example of the synchronization circuit shown in FIG. 6. The first and second synchronization circuits 41 and 42 have basically similar contructions, and therefore, the first synchronization circuit only is illustrated in FIG. 14A. The synchronization circuit 41 is comprised of a shift register 411, an EXOR gate 412, AND gates 413 and 414, and a pattern generator (PGR) 415. A safe guard circuit (GD) 416 can be employed, if necessary. The aforesaid comparator corresponds to the AND gate 413, the aforesaid inhibiting gate corresponds to the AND gate 414, and the aforesaid pattern generator corresponds to the pattern generator 415. The operation of the synchronization circuit will be made apparent with reference to FIGS. 4A through 4C and FIGS. 14B through 14G. The sub-data signals, in this example, the order-wires OWa and OWb (FIG. 4A), are applied to the shift register 411 and stored therein for a duration of ten time slots. The output from the pattern generator is used, finally, as the clock window CW (FIG. 4C) when the synchronization is established. Initially, however, synchronization is not established, and the AND gate 413 seeks the coincidence, together with the shift register 411 and the pattern generator 415, between the frame signals f of the order-wire OWa and OWb. When the EXOR gate 412 produces logics "1111—" in synchronism with the clock window CW, the AND gate 413 continually produces a logic "0". During the noncoincidence therebetween, the AND gate 413 produces logic "1", and therefore, the inhibiting gate 414 is closed. Therefore, the sub-data clock inherently contained in the order-wires OWa and OWb is stopped from passing therethrough. Thereby the phase of the clock window CW is delayed, which operation is repeated until the clock window CW reaches a nominal phase position, i.e., a synchronization mode.

The safe guard circuit 416 is useful for protecting the synchronization mode after the establishment thereof. The guard circuit 416 can be a counter, and thus, the guard circuit 416 does not produce the logic "1" until the logic "1" appears a number of predetermined times. This means that if a logic "1" is erroneously generated from the EXOR gate 413 during the synchronization state, the synchronization state is still maintained so long as the predetermined number of logics "1" are sent from the EXOR gate 413.

The above-mentioned explanations are made by taking as an example a case wherein the two pre-group data trains D1 and D2 are dealt with for data transmission. Obviously, the transmission frequency of the system will soon be increased to more than 810 MHz, such as 1.6 GHz, in the future. In such a high speed transmission system, three or more pre-group data trains having a transmission frequency of 405 MHz will be multiplexed to produce a main-group data train having a transmission frequency of about 1.6 GHz. If three pre-group data trains are to be multiplexed, the signal patterns of the sub-data signals must be different from that of FIGS. 4A and 4B. One example thereof will be described below.

Figures 15A, 15B, 15C, 16:
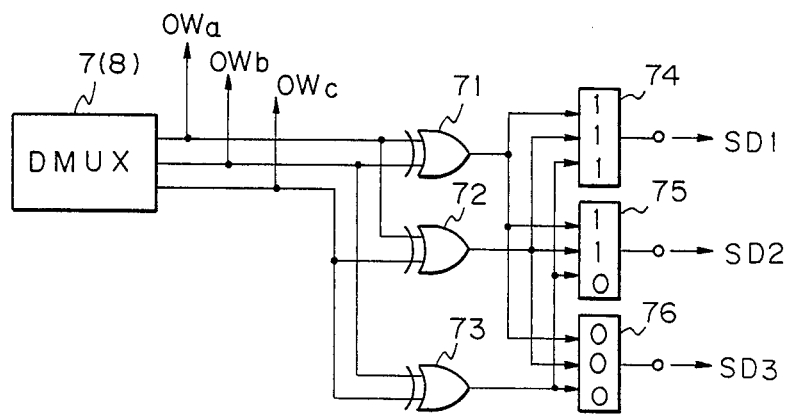
FIGS. 15A, 15B, and 15C depict signal patterns of the sub-data signals, where three pre-group data trains are to be distinguished from each other.
FIG. 16 is a circuit diagram of an example of a discriminator used for distinguishing the signal patterns shown in FIGS. 15A, 15B, and 15C.

FIGS. 15A, 15B, and 15C depict signal patterns of the sub-data signals, where three pre-group data trains are to be distinguished from each other. Note, in the example, the related sub-data signals are composed of the order-wire signals, as in the previous example. As seen from FIGS. 15A through 15D, the frame synchronization signals provide three different modes. That is, in FIG. 15A, all the signal patterns are different from one another and may be allotted to the data train D1. In FIG. 15C, all the signal patterns are the same as one another and may be allotted to the data train D3. In FIG. 15B, one of the three signal patterns is different from the remaining signal patterns and may be allotted to the data train D2.

FIG. 16 is a circuit diagram of an example of a discriminator used for distinguishing the signal patterns shown in FIGS. 15A, 15B, and 15C. FIG. 16 illustrates only a major portion of the discriminator corresponding to the discriminators shown in FIG. 6. That is, the major portion corresponds to each of the comparators (COMP1, COMP2) of FIG. 6. The demultiplexer 7 (8) produces the order-wire signals OWa, OWb, and OWc and these are applied to three EXOR gates 71, 72, and 73 with the wiring arrangement as illustrated. The EXOR gates 71, 72, and 73 are connected with three comparators 74, 75, and 76, as illustrated. The comparators 74, 75, and 76 contain individual comparison bits, i.e., "111", "110", and "000". Therefore, when the comparator 74 produces a coincidence signal SD1, this indicates that the received pre-group data train belongs to the first data train D1. This also applies to the remaining comparators 75 and 76.

As mentioned above in detail, the present invention can realize a main-group multiplexer and main-group demultiplexer having a very simple structure.

We claim:

1. A hierarchical data transmission method for a system comprising: a transmitter for providing a plurality of pre-group data trains, each pre-group data train composed of a main-data signal and a sub-data signal multiplexed with the main data signal; a receiver for reception of a main group data train and for reproduction of the pre-group data trains; and a transmission line connected between the transmitter and receiver, the method comprising the following steps:

(a) forming, in the transmitter, a plurality of pre-group data trains such that the pre-group data trains contain therein individual sub-data, the sub-data including an individual signal pattern identifying each corresponding pre-group data train;

(b) multiplexing, in the transmitter, the pre-group data trains into a main-group data train to be provided to the transmission line, by applying a parallel-serial conversion to the pre-group data trains;

(c) receiving, in the receiver, the main-group data train and demultiplexing the received main-group data train into a plurality of pre-group data trains, by applying a serial-parallel conversion to the received main-group data train; and (d) detecting, in the receiver, the individual signal patterns of each of the demultiplexed pre-group data trains and discriminating the pre-group data trains from each other in dependence on the individual signal patterns.

2. A method as set forth in claim 1, wherein, in said transmitter, the formation achieved in said step (a) and the multiplexing achieved in said step (b) are performed synchronously with each other, and in the receiver, the demultiplexing achieved in said step (c) and the discrimination achieved in step (d) are performed synchronously with each other.

3. A method as set forth in claim 2, wherein the sub-data forms a frame.

4. A method as set forth in claim 2, wherein frame synchronization signals respectively form the individual signal patterns.

5. A method as set forth in claim 4, wherein, when two pre-group data trains exist, one of the frame synchronization signals for identifying a first one of the two pre-group data trains includes a two bit arrangement pattern and another frame synchronization signal for identifying a second one of the two pre-group data train includes an inverted two bit arrangement pattern.

6. A method as set forth in claim 5, wherein order-wire signals are used as said sub-data.

7. A hierarchical data train system, comprising:
a transmitter for providing a plurality of pre-group data trains, each composed of main-data and sub-data multiplexed with said main data;
a receiver for reception of the mulitplexed data train and reproduction of the pre-group data trains; and
a transmission line connected therebetween;
the transmitter comprising N (where N is an integer larger than or equal to 2) pre-group multiplexer means and main-group multiplexer means, where each of said pre-group multiplexer being means for forming the sub-data including an individual signal pattern which is different from that of the sub-data signal contained in other pre-group data trains, and the main-group multiplexer means being for performing a parallel-serial conversion with respect to the N pre-group data trains to provide said main-group data train, serially multiplexed, to the transmission line; and the receiver comprising main-group demultiplexer means, N selector means, N pre-group demultiplexer means, and N discriminator means one being provided for each said pre-group demultiplexer means, where the main-group demultiplexer means being for performing a serial-parallel conversion with respect to the main-group data train serially multiplexed as supplied from the transmission line to reproduce the N pre-group data trains, the selector means being for selecting a proper one of the individual pre-group data trains under control of the respective discriminator means, and the discriminator means being for detecting whether the pre-group data train, now selected, is a proper or an improper data train using said individual signal pattern corresponding to the pre-group data train.

8. A system as set forth in claim 7, wherein the transmitter includes a clock generator which produces a references clock and a frequency divider, said parallel-serial converting main-group multiplexer means is driven by the reference clock, and each of said N pre-group multiplexer means is commonly driven by a sub-clock created by said frequency divides through frequency division which divides the frequency of the reference clock by N.

9. A system as set forth in claim 7, wherein the receiver includes means for reproducing said reference clock from the received main-group serial data train and a frequency divider, said serial-parallel converting main-group demultiplexer means is driven by the reproduced reference clock, and each of said N pre-group demultiplexer means is commonly driven by a sub-clock created by the frequency divider which divides the frequency of the reference clock by N.

10. A system as set forth in claim 8, wherein said parallel-serial converting main-group multiplexer means comprises:
front stage D-flip-flops for receiving the individual pre-group data trains transmitted, which front stage D-flip-flops are driven by said sub-clock;
reading gates connected to the outputs of the corresponding front stage D-flip-flops for sequentially outputting each of said pre-group data trains bit by bit using processed sub-clocks having respective phases different from each other to obtain serialized data trains; and
a rear stage D-flip-flop connected to the reading gates and receiving the serialized data trains and producing therefrom the main-group data train in synchronism with the reference clock.

11. A system as set forth in claim 9, wherein said serial-parallel converting main-group demultiplexer means comprises D-flip-flops and shift clock generators providing shift clocks, the D-flip-flops receive commonly the main-group serial data train from the transmitter, the D-flip-flops are driven by the respective shift clocks supplied from the respective shift clock generators, the shift clock generators produce shifted clocks in phase with respect to the reference clock, so that each of said D-flip-flops are clocked at the center of the corresponding one of the received serial data trains.

12. A system as set forth in claim 11, wherein, each of said selectors comprises NOR gates which receive, at first inputs, the pre-group data trains and, at second inputs, the control signals supplied from a corresponding one of said disriminators, which control signals specify which one of the NOR gates is to be opened, so as to supply the thus-selected data train to the corresponding demultiplexer.

13. A system as set forth in claim 7, wherein each of said discriminator means comprises a discrimination comparator and a synchronization circuit, the discrimination comparator detects whether the indivdual signal pattern of the received sub-data coincides with the predetermined proper individual signal pattern, and the synchronization circuit activates the discrimination comparator synchronously with the received sub-data contained in the received pre-group data train.

14. A system set forth in claim 13, wherein each of said synchronization circuits comprises a synchronization comparator receiving, at a first input the sub-data in the form of a frame, an inhibiting gate, and a pattern generator connected to the inhibiting gate, the synchronization comparator receives, at a second input, a predetermined frame synchronization signal pattern used as said individual signal pattern, and produces an inhibiting signal ever time a noncoincidence therebetween is detected, the inhibiting gate passes therethrough a sub-data clock contained inherently in the sub-data, and is closed by the inhibiting signal, and the pattern generator receives the output clock from the inhibiting gate and produces a pulse pattern synchronized with the frame synchronization signal, which pulse pattern is supplied to said discrimination comparator for activating same.

15. A system as set forth in claim 14, wherein each of said discriminators includes a safe guard circuit connected between said synchronization comparator and said inhibiting gate.

16. A system as set forth in claim 13, further comprising a safe guard circuit connected between each of said discriminators and the corresponding one of said selector means.

17. A system as set forth in claim 14, wherein said comparator in each of said discriminator means comprises a first EXOR gate with two inputs and producing an output, a second EXOR gate with first and second inputs, and a NOR gate with first and second inputs, said sub-data signal is successive first and second order-wire signals each having a predetermined signal pattern of alternating logic bits, the first EXOR gate receives, at the two inputs, the first and second order-wire signals, the second EXOR gate receives, at the first input, the output from the first EXOR gate, and, at the scond input, a predetermined logic externally supplied from a preset terminal, and the NOR gate receives, at the first input, the output from the second EXOR gate and, at the second input, said clock which is synchronized with said frame synchronization signal and supplied from a corresponding one of said synchronization circuits.

18. a data transmission system, comprising:
first means for multiplexing first data signals, inserting a first identifying signal in said multiplexed first data signal and producing a first output;
second means for multiplexing second data signals, inserting a second identifying signal different from the first identifying signal in said multiplexed second data signals and producing a second output;

parallel-to-serial converting means for combining the first and second outputs;

a transmission path carrying the combined first and second outputs;

serial-to-parallel converting means for separating the combined first and second outputs;

first selecting means for selecting the first output in dependence on the first identifying signal;

second selecting means for selecting the second output in dependence on the second identifying signal; and first and second demultiplexing means for demultiplexing the first and second data signals from the first and second outputs.

* * * * *

UNITED STATES PATENT AND TRADEMARK OFFICE
CERTIFICATE OF CORRECTION

PATENT NO. : 4,727,541
DATED : February 23, 1988
INVENTOR(S) : Masakazu Mori, Takeo Fukushima and Naonobu Fujimoto It is certified that error appears in the above-identified patent and that said Letters Patent is hereby corrected as shown below:

```
Column 3,  line 34, "figrst" should be --first--.

Column 7,  line 50, "e,ovs/F/" should be --F̄--.

Column 8,  line 26, "+" should be -- - --.

Column 12, line 30, "vai a" should be --via--;
           line 38, "patten" should be --pattern--.

Column 14, line 44, "2" should be --3--;

Column 15, line 25, "references" should be --reference--;
           line 29, "divides" should be --divider--.

Column 16, line 26, "ever" should be --every--;
           line 54, "scond" should be --second--.
```

Signed and Sealed this

Thirteenth Day of September, 1988

*Attest:*

DONALD J. QUIGG

*Attesting Officer*  *Commissioner of Patents and Trademarks*